SYED M. HUSAINI
INVENTOR

BY Delmar H. Jacobs

AGENT

United States Patent Office 3,423,397
Patented Jan. 21, 1969

3,423,397
TUMBLING PROCESS FOR THE PRODUCTION OF READILY SOLUBLE ALGIN
Syed M. Husaini, New Delhi, India, assignor to Adolph's Food Products Mfg. Co., Burbank, Calif., a corporation of California
Filed Aug. 12, 1965, Ser. No. 479,106
U.S. Cl. 260—209.6   14 Claims
Int. Cl. C08b 19/10

ABSTRACT OF THE DISCLOSURE

Algin, particularly sodium alginate, which normally is difficult to dissolve in water, is treated in accordance with the invention by simultaneously tumbling in a suitable mechanical device and contacting with added water or live steam. The algin undergoes a structural change, the starting mass of fibers and small particles being converted to dense, translucent, amber-like particles which are readily and speedily dispersible in water without lumping problems. The product of the tumbling process described may be used as is, or may be dried and comminuted.

---

This invention relates to a process of treating algin whereby its dispersibility in water is greatly enhanced and to the product obtained thereby.

As is well known, the term "algin" is widely used for the water-dispersible derivatives of alginic acid, which is a polymannuronate derived from common species of brown seaweed, and widely produced commercially in various parts of the world, particularly in southern California from the kelp beds of the Pacific Ocean. A useful review of alginic acid and algins generally appears in the American Chemical Society publication "Natural Plant Hydrocolloids," which is Advances in Chemistry, No. 11, Washington, 1954, on pages 68–82, which, with its bibliography, is hereby incorporated herein by reference.

Perhaps the most widely used algin is sodium alginate, which is the sodium salt of alginic acid. This is commercially produced in a powder form, which, regardless of whether the mesh size is fine or coarse, requires a combination of time and agitation for dispersion in cold water. Sodium alginate eventually dissolves in water to give a colloidal solution, but the individual particles of sodium alginate swell before they dissolve; and, accordingly, complete dissolution takes time, which in many commercial applications of algin may be helped somewhat either by the application of heat or agitation to the system, or, indeed, by a combination of both. However, intense agitation often causes foaming problems, and higher temperatures are only partially effective in improving dissolution.

In many applications of algins, however, it is not practicable to provide heat and agitation. This is particularly the case where relatively small quantities of a preparation containing algin is made up into a water system intermittently, and even casually. Examples include dessert gels intended for household use, wherein a high intensity agitation device is either unavailable or too complicated for ordinary use; and, in such systems as dental impression compounds, where a dental assistant or nurse must repeatedly make up small batches of the compound with water, and where again the necessity of either heat or mechanical agitation would be an obvious practical disadvantage.

An object of the present invention is to provide a comminuted algin which is readily and quickly dispersible and dissoluble in water at room temperature, with a minimum of agitation, and to provide a process for obtaining such a product.

Another object of the present invention is to provide a product and process as aforesaid, in which the invention may optionally be carried out without chemical additaments.

Further objects of the invention will become apparent as the description thereof proceeds.

Figure 1:
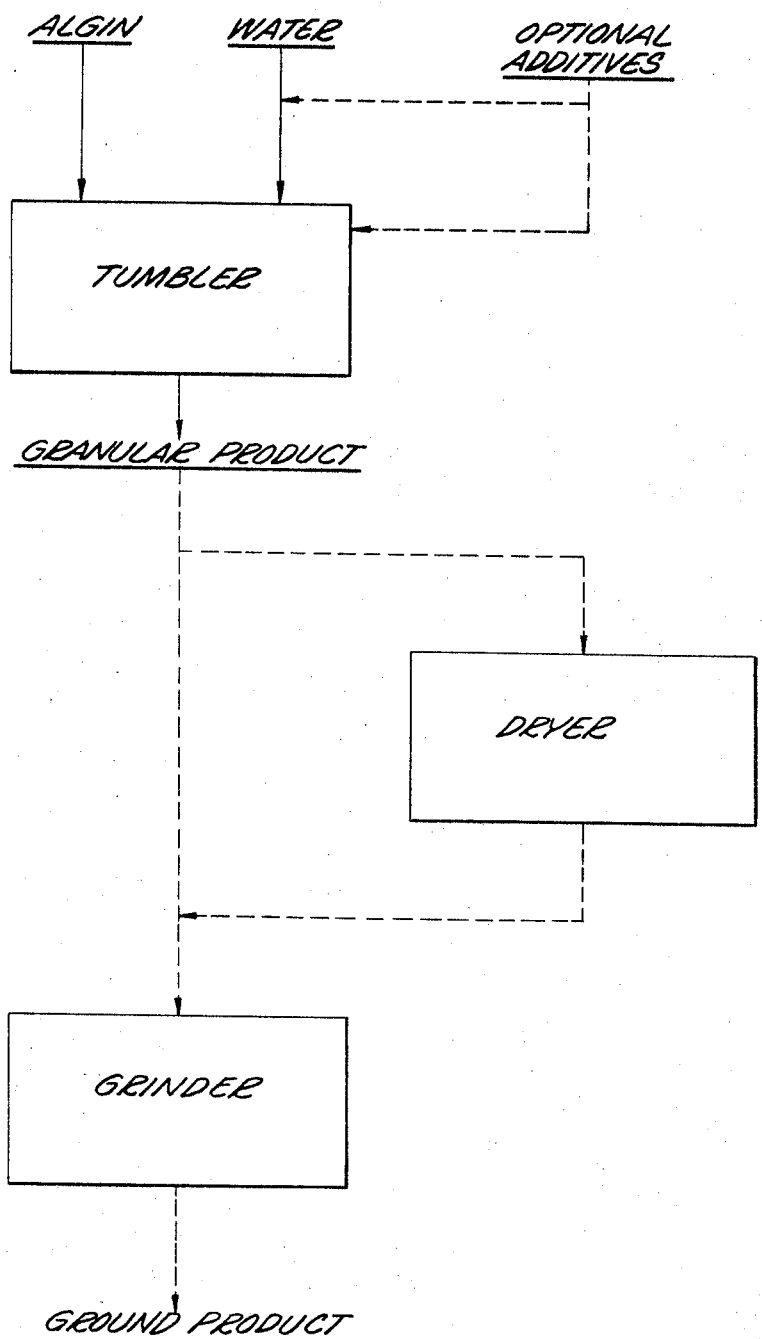
Figure 2:
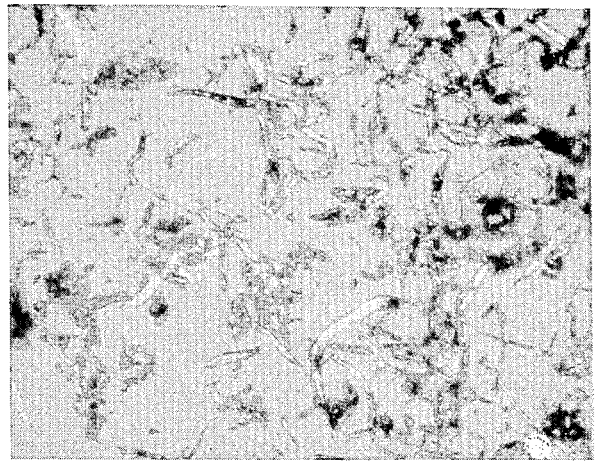
Figure 3:
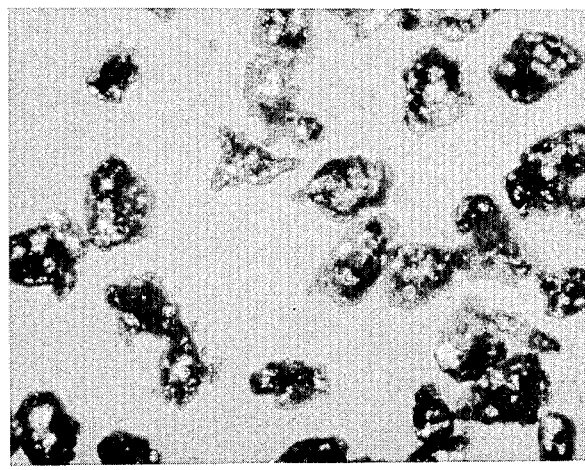

In the drawings, FIGURE 1 shows a block diagram exhibiting various steps of my inventive process, while FIGURES 2 and 3 are photomicrographs of an algin before and after treatment in accordance with the invention.

Generally speaking, and in accordance with illustrative embodiments of my invention, I commence with any commercially available algin, most commonly and by way of example, any ground or otherwise comminuted sodium alginate, including any or all of those commonly known as "high viscosity," "medium viscosity," and "low viscosity"—these being accepted trade designations in the algin art.

It has been my experience that such commercially produced algins are not readily and quickly dissoluble in cold water, and even when intensive agitation is employed, considerable time is still required for dissolution. In certain special cases, it is possible to admix the algin with a comminuted water-soluble substance such as, for example, sugar, so that the separate particles are held apart and, when such a mixture is added to water, dissolution may be facilitated to some extent, since clumping or aggregation of the powdered algin is in some measure prevented thereby. Even this stratagem does not solve the problem completely, and more agitation is necessary than is desirable.

There are many cases in which it is not permissible to utilize the partially favorable effects of admixing with granulated sugar and the like as just mentioned above. An instance is that of algin compositions intended for the preparation of dietetic dessert gels in which sweetness is imparted by saccharine or sodium cyclamate, and the use of sugar is quite inadvisable. Dissolution is a particularly difficult problem in such instances.

Returning now to the illustrative embodiment, the aforesaid algin, which may be, for example, of about 150 mesh, although, indeed, any commercially available powdered or fine granular algin may be used, is placed in a suitable blending, tumbling, or mixing device and is simultaneously tumbled and treated with water or with live steam, or, indeed, both, the function of the tumbling being both to insure uniform access of the steam to the algin and also to bring about an astonishing and wholly unforeseeable structural change in the algin which will be described in greater detail hereinbelow.

The device used may be any of the well-known blenders and tumblers common in the mixing art. Three such tumbling-type mixers are described in the section headed "Blenders and Tumblers" on pages 302–304 of the book Chemical Process Machinery by Riegel, second edition, New York: 1953, which pages are hereby incorporated herein by reference. A particularly effective device, which I prefer and, indeed, find best for use in my process, especially for moderate batch quantities, is the Patterson-Kelley twin shell blender, which may be described as a chamber in the form of a pipe joint L, which is rotated about a horizontal axis which meets the two axes of the pipe or tube sections forming the L at an angle of 45°. These are widely known and are described, for example, on pages 1–9 of section P–2 of Chemical Engineering Catalog, 49th edition/1965, New York, 1964, which also are incorporated herein by reference, together with section P–1 thereof. Pages 8–9 of section P–1 of the work just cited described various sizes of tumbling-type blenders such as described on page 302 of the book by Riegel already cited.

Continuing with the illustrative embodiments, the simultaneous tumbling and hydration is continued until the algin has taken up anywhere from about 3 pounds to about 500 pounds of water per initial 100 pounds of algin subjected to treatment in accordance with this invention. The best amount which I have found is approximately 200 pounds of water per 100 pounds of algin.

The time of processing as aforesaid will naturally vary with the rate at which the steam or water is admitted to the blender during the tumbling process and to the amount of steam eventually used. In typical cases, where the ratio is approximately two parts of water to one part of algin, about 15 minutes total tumbling and water admittance time is sufficient. Where steam is used, the processing time is shorter, such as three or four minutes. Generally speaking, I find that steam is best at low ratios, from about 3 to 50 pounds water per 100 pounds of algin, while for higher ratios, including the optimum ratio of 200:100, water is best, and it may be at room temperature, hot water being usable but offering no practical advantages over cold.

I have found that astonishingly enough, that even with this treatment, and even at the maximum ratio of water used as aforesaid, the algin still pours out of the blender when discharged, behaving essentially as loose granular material. The swelling in volume is considerable, and this, of course, must be taken into account when loading the blender for any particular batch. About 15 to 20 pounds of algin per cubic foot capacity of the blender is suitable, at a 2:1 water ratio.

It is, of course, within the broad purview of the invention to carry out the process in a continuous fashion, instead of batch-wise, but in this case it is, of course, necessary to use a blender adapted to continuous processing. Pages 8 and 9 of section P–2 of the Chemical Engineering Catalog already cited show an apparatus suitable for continuous processing in accordance with the invention; it is essentially a multiplicity of the "Pipe L" arrangement connected end-to-end in series and rotated about a horizontal axis as a unit.

It will be readily understood that when steam is used, it is eventualy taken up by the algin in the form of water. It will be understood, accordingly, that while I have described my invention in terms of liquid water and prefer and find it best, it is possible to carry out the invention, especially at low water ratios, using water in its vapor form, i.e., steam, and this is to be understood as included in this disclosure and claims when I speak of "water" therein.

The macroscopic change which takes place in accordance with the treatment just described is that the algin is agglomerated into granules having an appearance in size not unlike the well-known breakfast cereal called "Grape Nuts." That is, the granules are roughly isodimensional but have a highly irregular surface, and are, in general, from 1/16" to 3/16" in overall size.

The material discharged at this stage of my inventive process may, of course, be used directly in that form, but the granules will contain the water added so that prompt utilization in the final aqueous solution contemplated will be necessary. Only some of the advantages of my invention would be obtained if this were done since a principal object is to prepare a powdered algin product which may be kept for use for an indefinite period of time and then may be incorporated in a final aqueous dispersion with the rapidity of dissolution already described. Accordingly, the next step in my process, although it will be clear that strictly speaking, it is an optional one, is to dry the material discharged from the tumbler, by passing it through any conventional and suitable dryer, such as a tray dryer, a rotary dryer, or the like. In general, it is desirable to bring the algin product back to its approximate starting moisture content which in commercially available algins is of the order of 3 to 8 percent, although it will be understood that these are approximate and not absolute limits. Where the minimum amount of water has been added in the first stage of my process, such as, for example, three or four pounds of water per initial 100 pounds of algin, the drying step may be omitted if desired. While the drying temperature may be as high as about 210° F., I find that a better product is obtained if relatively low temperatures are used, and in particular, from 110° F. to 130° F. is best. While this is rather low, actual drying times with commercial dryers are not excessive. It goes without saying, of course, that the drying step could also be carried out at room temperature, by using a vacuum drying apparatus of conventional type or also dessicators, the air in the dessicator being held to a low relative humidity by silica gel, calcium chloride, or the like.

I may use the tumbled, water-treated algin in the granule form as it issues from the dryer, or I may grind it, so that the granules are ground to a relatively fine powder. I prefer to grind the granules rather than to use them in coarse granular form. The grinding may be carried out by any well-known device for comminuting material in this general class such as a hammer or roller mill. While various fineness of grinds may be used, I obtain remarkably superior results at about 120 mesh, and particularly at through 80 mesh, retained on 150 mesh.

I am not certain why my inventive process brings about the remarkable change in the hydrating properties of the algin that it does. While not wishing to be bound to any process of operation, examination under the microscope shows the appearance of commercial algins to be a mixture of powdery and somewhat fibrous particles, and examination of this under a high power shows a relatively opaque structure. After treatment with water and tumbling in accordance with the invention, the granules have a remarkable appearance resembling fragmented amber, in that they are fairly translucent and the individual particles observable in the starting algin have disappeared completely. These are clearly shown in FIGURES 2 and 3 respectively, the magnifications of these photomicrographs being such that the long (horizontal) side of the photographs corresponds to 1.6 millimeters in the original.

One would ordinarily consider that a dense, relatively homogeneous, translucent particle would hydrate more slowly, but astonishingly, this is not the case. It may be connected with the fact that some initial hydration of the algin takes place in the inventive processing, so that even though relatively large granules are formed, these exhibit great ease of dissolution. Subsequent reduction of the granules to the same apparent mesh size as the starting algin preserves the readiness of dissolution, and it is possible to prepare an algin treated in accordance with my process which, subsequent to grinding of the granules, exhibits the same screen analysis as the starting material, but which dissolves in cold water under any specified condition of gentle agitation or stirring, many times more quickly than the starting material. A specific instance appears under Example I hereinbelow.

In many applications of my algin product, it is incorporated with other substances to form a composition for some particular use, such as food use, dental impressions, and the like. It is within the purview of the invention to incorporate one or more optional additives along with the water in the tumbling process. Thus, where a food composition is to be prepared, coloring matter or flavoring material or both may be so added, and the uniformity and homogeneity and incorporation in the algin product will be very great. Likewise, if such materials as sodium hexametaphosphate, saccharin, and the like are used, particularly when these are water soluble, they may be likewise advantageously added at this point.

I will now give some examples of proceeding in accordance with my invention:

EXAMPLE 1

Commercial sodium alginate, sold under the trade name of "Keltone" and having a mesh size of about 150 mesh, and giving a one percent solution in water having a viscosity of about 400 centipoises (and therefore termed a medium viscosity algin) is loaded into a one-cubic-foot twin shell blender of the type already described, and, indeed, more particularly as shown on page 5 of section P-2 of the Chemical Engineering Catalog already referred to. Six pounds of the algin was introduced, the apparatus put into rotation, and 12 pounds of water introduced over a 10-minute period. After introduction of the water, tumbling was continued for an additional 5 minutes, making a total of 15 minutes. The blender was then opened, and the processed algin was dumped out, and it flowed freely and had the granular appearance already described hereinabove. The product was then dried in a laboratory tray dryer at 110° F. to 130° F. overnight, to a moisture content of about 4 percent approximating the starting material. It was then ground in a laboratory hammer mill (a "Bantam Mikro-Pulverizer" as described on page 2 of section P-11 of the aforesaid Chemical Engineering Catalog) to a mesh size of through 80, retained on 150 mesh.

In order to show the enhanced dispersibility achieved in accordance with the invention, tests were conducted in which 250 grams of a mixture of water with three different concentrations of the dried and ground product obtained as described above were placed in a 600-milliliter glass beaker and agitated by a laboratory-type propeller mixer operated at 700 r.p.m., at a room temperature of 75° F. The time necessary for complete dissolution of the algin, before and after treatment in accordance with the invention, was noted and appears in the table below:

TABLE I

| Weight Percent Algin in Water | Time in Minutes Necessary for Complete Solubility | |
| --- | --- | --- |
| | Product of Example 1 | Untreated Starting Material |
| 0.5 | 2.5 | 10.0 |
| 1.0 | 4.0 | 15.5 |
| 1.5 | 5.0 | 17.0 |

EXAMPLE 2

The processing run of Example 1 was repeated except that in the water prior to admitting it to the blender, 1.5 pounds of sodium hexametaphosphate were dissolved. A product was obtained as described hereinabove, and as will be evident to those skilled in the art, the resulting algin product had a "built-in" neutralizer for water hardness in the form of the sodium hexametaphosphate.

EXAMPLE 3

A cold-water soluble dessert gel of the "dietetic" type containing no sugar was formulated with the algin product obtained as described in Example 1 hereinabove. The following table gives the ingredients and the weights thereof, in proportions to give a quantity of the dessert composition sufficient for addition for one pint of water:

| Ingredient: | For one pint of water (grams) |
| --- | --- |
| Sodium alginate from Example 1 | 2.40 |
| Tricalcium phosphate | 0.40 |
| Sodium hexametaphosphate | 1.50 |
| Adipic acid | 2.50 |
| Saccharin | 0.04 |
| Sodium cyclamate | 0.40 |
| Cherry flavor | 0.60 |
| Red food color | 0.02 |
| | 7.86 |

When 7.86 grams of the above-formulated composition was stirred into a pint of water using an ordinary kitchen mixing bowl and spoon, dissolution to give a clear, pink solution was complete in about 15 seconds' stirring; and, upon standing for an additional 15 minutes, a firm, palatable gel resulted.

EXAMPLE 4

The formulation shown in Example 3 was carried out, except that sodium alginate from Example 2 was used, and only 0.90 gram of sodium hexametaphosphate was added to the dry mix, the sodium alginate itself already containing the remainder. The results of preparing a dessert gel using cold water were identical with those described in connection with Example 3.

EXAMPLE 5

Sodium alginate, low viscosity grade, a commercial production of about 100 mesh, was placed in an 18-inch "Type A" Patterson "ThoroBlender," a tumbling blender, as described on page 8 of section P-1 of the Chemical Engineering Catalog aforesaid, equipped with a horizontal steam injection tube coinciding with the axis of rotation of the blender. Eight pounds of sodium alginate were used, and after placing the blender in rotation, live steam was introduced over a period of 15 minutes, at a rate slow enough that it was all taken up by the algin without the necessity of having to vent any live steam to the atmosphere. In this manner, the algin was allowed to take up 7 pounds of water in the form of steam condensed in and on the algin particles in the fashion already described. At the end of the 15-minute period, introduction of steam and the tumbling were stopped, and the load was discharged as a uniform, flowable granular product. Stirring tests in water showed very rapid dispersion and even upon grinding the algin to −80 mesh and also to −200 mesh in a laboratory hammer mill, stirring in cold water again produced more rapid dispersion than the starting material.

The drawing, as mentioned, shows an outline of steps in my inventive process. Algin and water are shown as feeds to a tumbler, and optional additives, so indicated by broken lines, are shown as entering either the water feed or entering the tumbler directly. A granular product is shown as the product issuing from the tumbler. The optional steps of drying and of passing the granular product to a grinder are shown again by dashed lines, as is also the ground product resulting from the optional grinding step.

It will be understood that while I have described my invention with the aid of numerous specific embodiments in which various proportions by weight, starting materials, apparatus, and the like have been given, nevertheless, my invention is a broad one, and I do not mean to be limited to specific conditions and the like, since numerous variations in materials, operating conditions, and the like are possible within the broad scope of the invention as defined in the claims which follow.

Having described my invention, I claim:

1. A process of treating comminuted algin comprising the steps of tumbling said algin, and during said tumbling, introducing water in a proportion within the range of three pounds of water to 500 pounds of water for each 100 pounds of algin, and continuing said tumbling until said algin has taken the form of homogeneous granules.

2. The process in accordance with claim 1 wherein said algin is sodium alginate.

3. The process in accordance with claim 1 wherein said water is used in the ratio of about 200 pounds for each 100 pounds of said algin.

4. The process in accordance with claim 3 wherein said algin is sodium alginate.

5. A process of treating comminuted algin comprising the steps of tumbling said algin, and during said tumbling, introducing water in a proportion within the range of three pounds of water to 500 pounds of water for each 100 pounds of algin, and continuing said tumbling until said algin has taken the form of homogeneous granules, drying said algin, and thereafter comminuting said algin.

6. The process in accordance with claim 5 wherein said drying is carried out to a final moisture content of said algin within the range of about 3% to about 8%, and wherein said comminution is carried out to a final mesh of about through 80 and retained on 120 mesh.

7. The process in accordance with claim 5 wherein said algin is sodium alginate.

8. The process in accordance with claim 5 wherein said water is used in the ratio of about 200 pounds for each 100 pounds of said algin.

9. The process in accordance with claim 8 wherein said algin is sodium alginate.

10. The product obtainable in accordance with the process of claim 1.

11. The product obtainable in accordance with the process of claim 3.

12. The product obtainable in accordance with the process of claim 5.

13. The product obtainable in accordance with the process of claim 6.

14. The product obtainable in accordance with the process in claim 8.

References Cited

UNITED STATES PATENTS 3,116,150  12/1963  Baker _____ 99—1 XR

DONALD E. CZAJA, *Primary Examiner.*

R. W. MULCAHY, *Assistant Examiner.*